Jan. 11, 1966  B. A. STOUT ETAL  3,228,176
GRAIN THRESHING MECHANISM
Filed Aug. 4, 1964  5 Sheets-Sheet 1

INVENTORS
BILL A. STOUT &
ROBERT E. STROHMAN
BY Walter V. Wright
AGENT

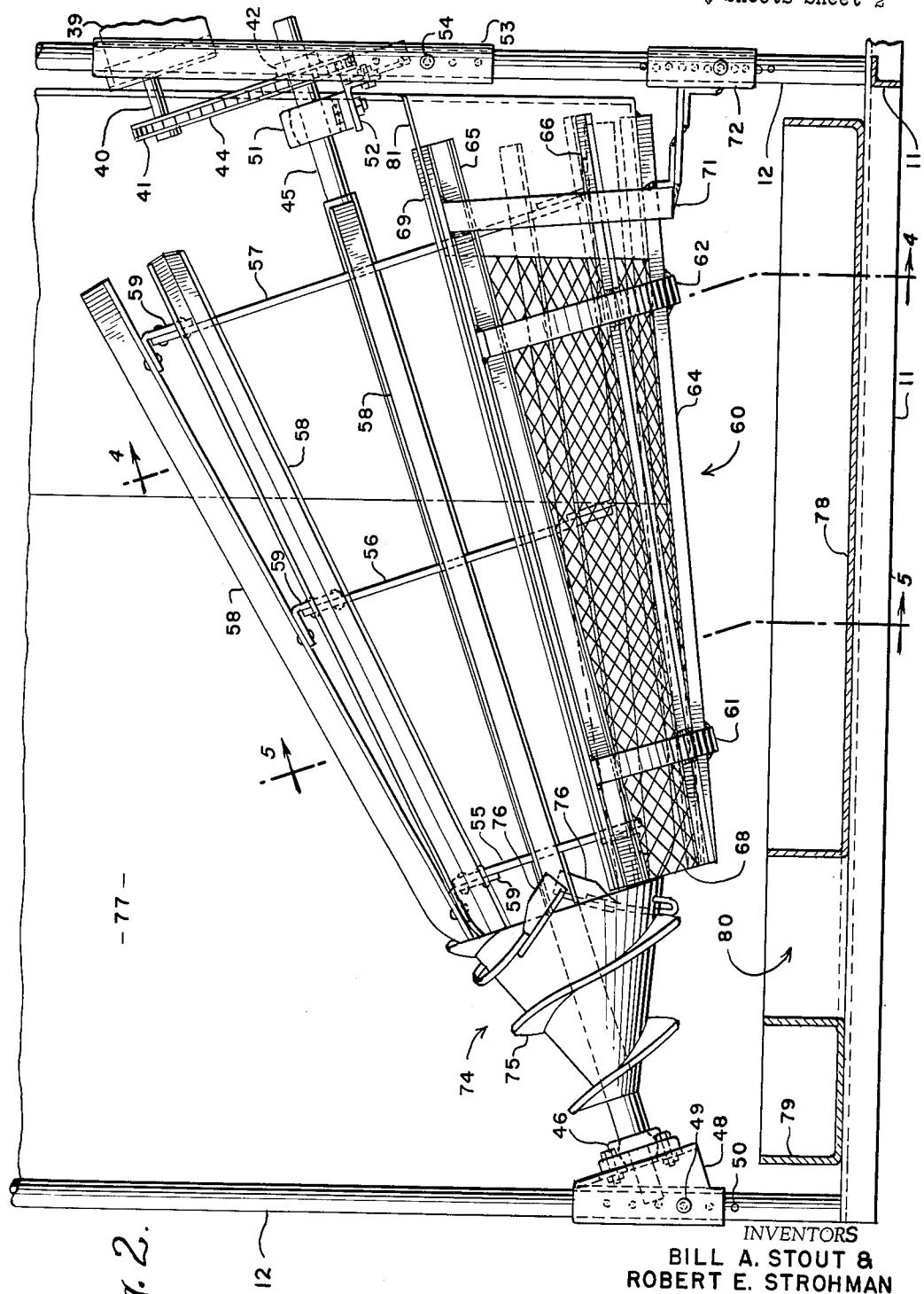

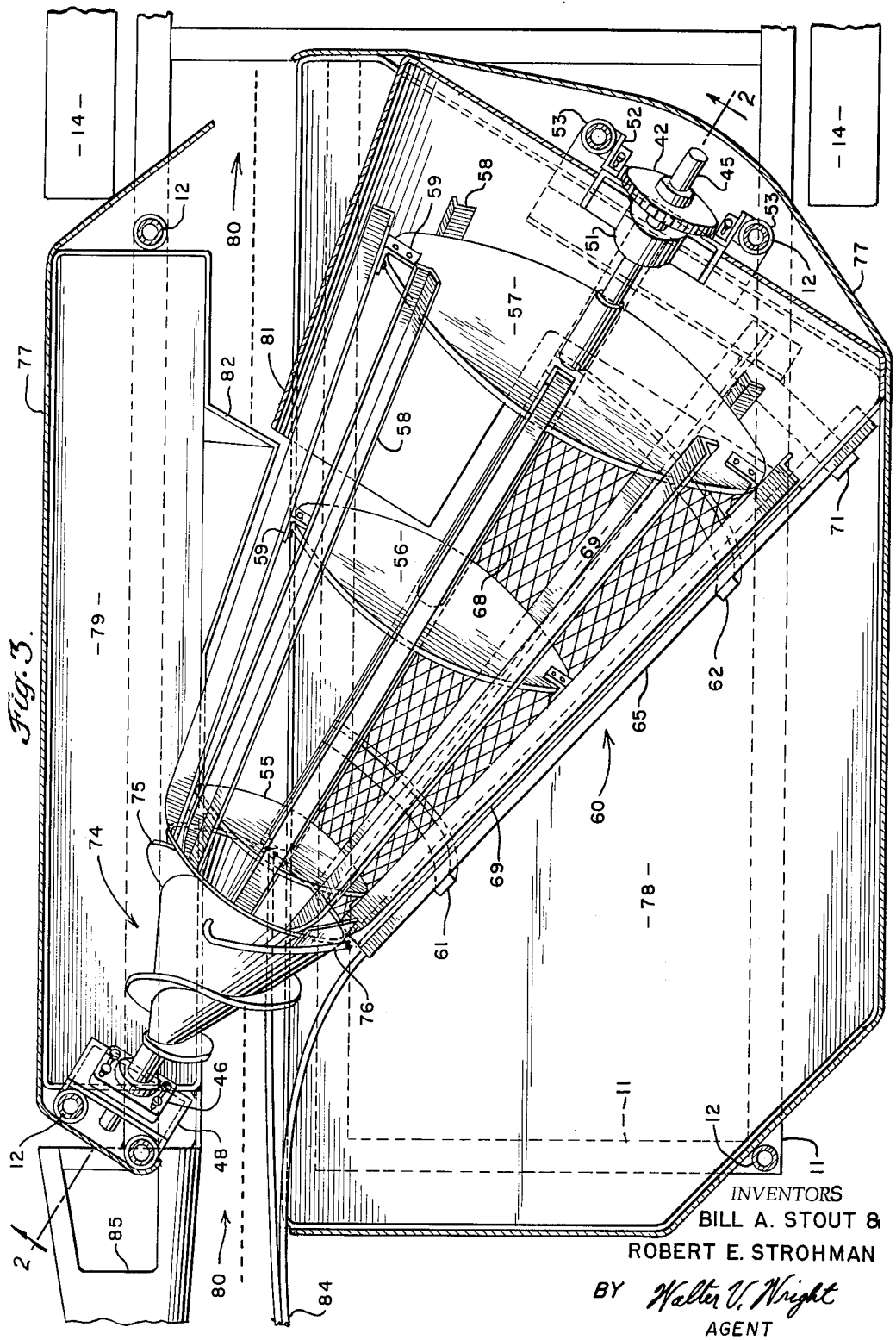

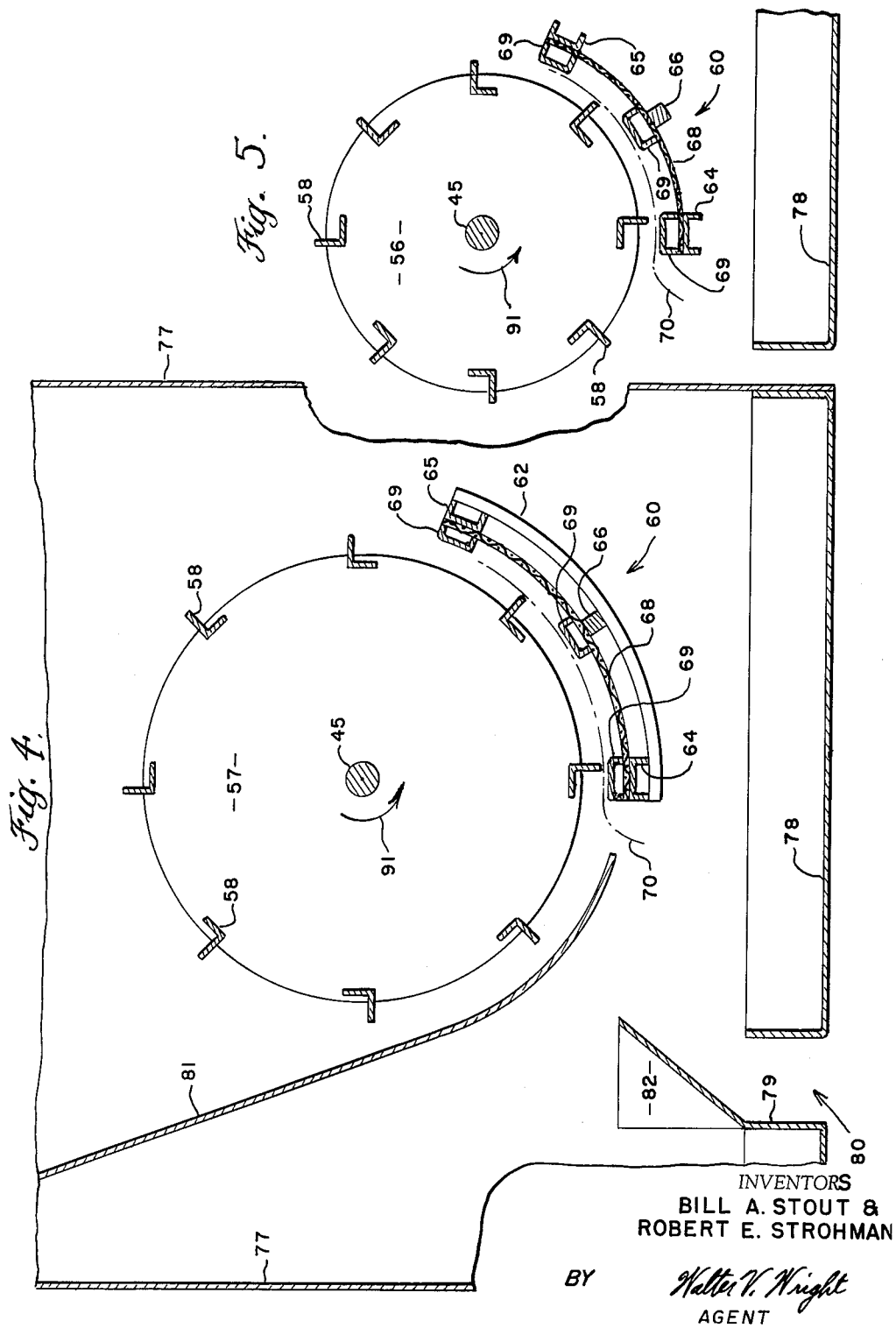

Jan. 11, 1966  B. A. STOUT ETAL  3,228,176
GRAIN THRESHING MECHANISM
Filed Aug. 4, 1964  5 Sheets-Sheet 5
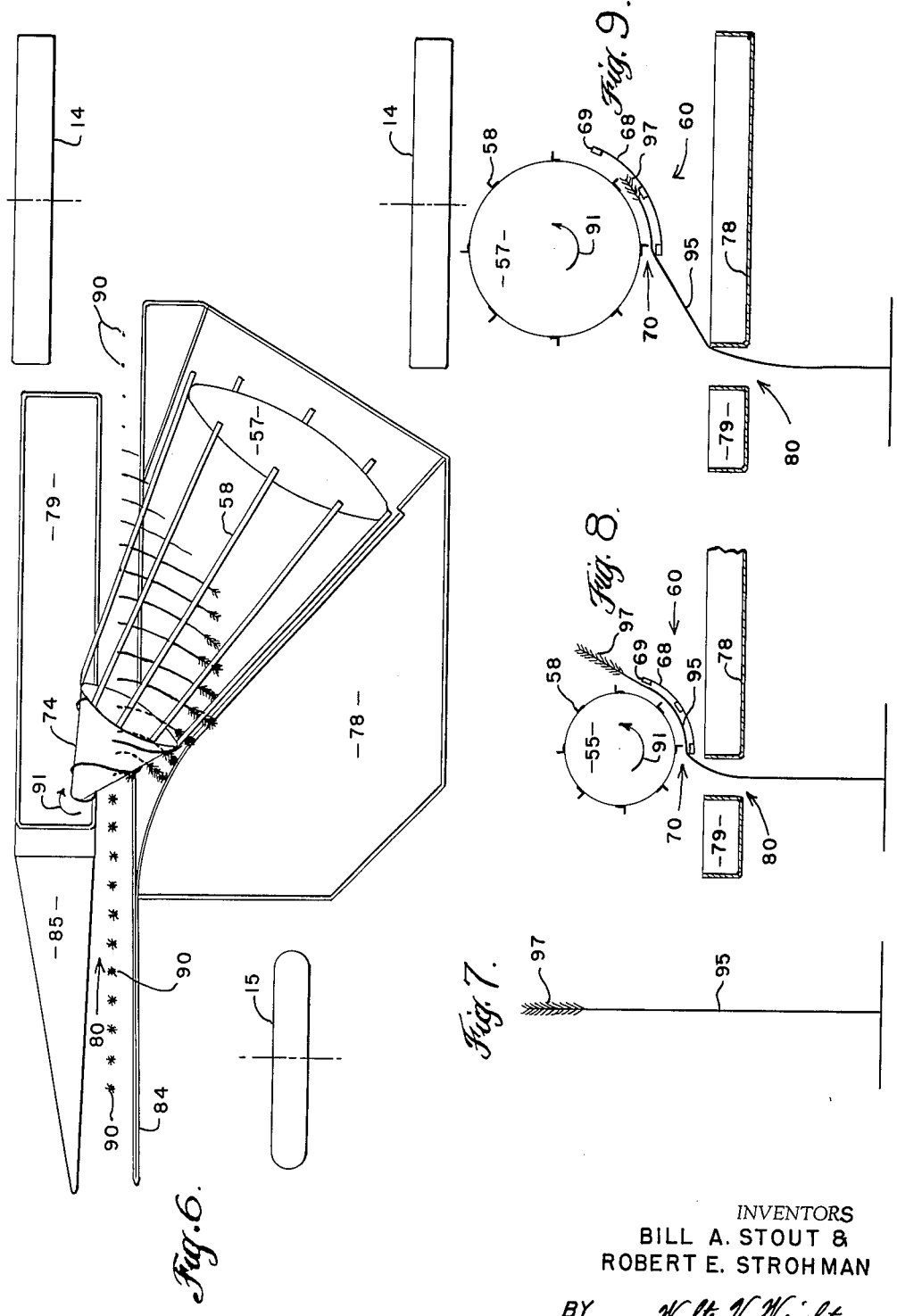
INVENTORS
BILL A. STOUT &
ROBERT E. STROHMAN
BY Walter V. Wright
AGENT

United States Patent Office 3,228,176
Patented Jan. 11, 1966

3,228,176
GRAIN THRESHING MECHANISM
Bill A. Stout, East Lansing, and Robert E. Strohman, Lansing, Mich., assignors to Michigan State University, East Lansing, Mich.
Filed Aug. 4, 1964, Ser. No. 387,301
10 Claims. (Cl. 56—19)

This invention relates generally to grain harvesting mechanism. More specifically, it relates to mechanism for harvesting kernels of grain from stalks still attached to the ground without cutting, or harvesting, the stalks. The preferred embodiment is particularly adapted for harvesting crops which are grown in, or can be divided into, rows, such as rice for one example.

Conventional grain harvesters generally sever at least a portion of the stalk from the ground, then transport and feed the severed portion of the stalk and the grain kernels thereon to a threshing device wherein the grain is rubbed, or struck, loose from the severed stalk portion. The grain and stalk portion are then separated from each other and the grain is collected in tanks or bins while the stalk portion is usually deposited back on the ground to be plowed under. The many mechanisms that must be provided on a single mobile unit in order to perform all these steps in the grain harvesting operation usually result in a mechanically complex, high cost and high power consuming machine. Needless to say, each kernel of grain that is damaged or missed during a harvesting operation constitutes an undesirable loss which, in effect, increases the operating cost of the harvester.

It is a general object of this invention to provide mechanically simple, low cost, low power consuming apparatus for harvesting grain while reducing to a practical minimum losses due to missed and damaged grain.

It is another object of this invention to provide apparatus which will bring the heads of grain stalks into contact with a threshing device without severing them from the stalk or severing the stalk from the ground, thereby eliminating the conventional harvester crop severing mechanism.

It is another object of this invention to provide grain harvesting apparatus in which stalk feeding means is mounted on the same shaft and rotates together with a threshing rotor, thereby eliminating the conventional harvester stalk transport and feeding mechanism.

It is another object of this invention to provide grain harvesting apparatus in which the kernels which have been removed from the stalk are not mixed again with the straw from which they were removed, thus eliminating the conventional straw separating means.

It is another object of this invention to provide grain harvesting apparatus which will facilitate the operation of plowing under the straw by leaving the entire stalk attached to the ground after the grain has been removed.

It is another object of this invention to provide apparatus for harvesting grain with a minimum of damage to the straw, thereby increasing its value as a by-product for rope, mats, etc.

It is another object of this invention to provide grain harvesting apparatus in which a portion of the stalk below the grain bearing head enters the space between a threshing rotor and fixed threshing reaction means prior to entry of the grain bearing head into the same space and in which the kernels of grain are removed from the head starting with the kernel at the base of the head and proceeding in sequence toward the tip thereby greatly reducing the possibility of kernels being missed in the threshing operation.

It is another object of this invention to provide grain harvesting apparatus in which the impact force which removes the kernel from the stalk is applied as close as possible to the point of attachment of the kernel to the stalk thereby reducing the total force required for removal and reducing the damage to the kernels caused by impact.

Another object of this invention is to provide grain harvesting apparatus in which the relative motion between the stalk and a fixed point in the path of the threshing impact means is in the opposite direction to the relative motion between the same fixed point and the impact means, thus reducing the absolute velocity of the impact means required to obtain a given relative velocity between the grain and the impact means.

It is another object of this invention to provide grain harvesting apparatus in which the head portion of each stalk is passed through continuously increasing peripheral rotor speeds in such a way that easily threshed kernels are threshed at low speeds with a minimum of damage while those which need higher impact velocities for removal from the stalk are subjected to these higher speeds before leaving the threshing rotor.

These and other objects and advantages of this invention will be apparent upon reference to the following description and claims taken in conjunction with the accompanying drawings wherein:

FIG. 2 is an enlarged partial section and partial elevational view of the grain threshing rotor taken on the line 2—2 of FIG. 3;

FIG. 3 is a plan view of the rotor structure shown in FIG. 2 with portions of the housing broken away and shown in section;

FIG. 4 is a diagrammatic sectional view taken on the line 4—4 of FIG. 2;

FIG. 5 is a diagrammatic sectional view taken on the line 5—5 of FIG. 2;

FIG. 6 is a diagrammatic plan view illustrating the operation of the preferred embodiment of the present invention; and FIGS. 7, 8 and 9 are respectively, diagrammatic illustrations of a grain stalk prior to engagement by the harvesting machine; a grain stalk shortly after entering the harvesting machine; and a grain stalk shortly prior to leaving the harvesting machine.

Figure 1:
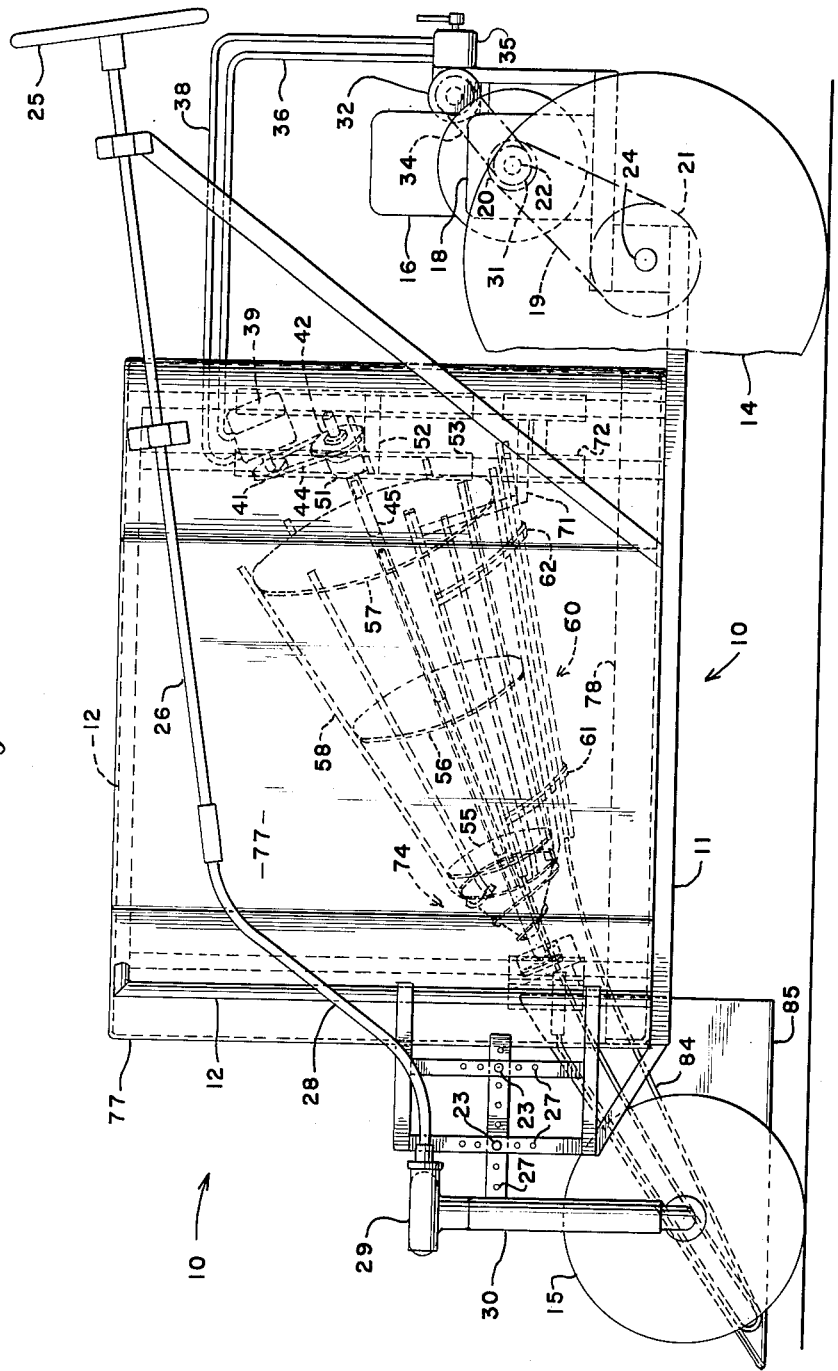
FIG. 1 is a partially diagrammatic side elevational view of a grain harvesting device constructed in accordance with the principles of the present invention.

Referring to the drawings in detail, the reference numeral 10 in FIG. 1 indicates, generally, a three dimensional frame structure having base frame members 11 and tubular top frame members 12. The frame 10 carries a pair of rear driving wheels 14 and a front castor-type steerable wheel 15 which is offset to the left of the longitudinal center of the machine as may be seen in diagrammatic FIG. 6. Referring to FIG. 1, an engine 16 is mounted at the rear of the frame 10 and drives the rear wheels 14 through a conventional transmission 18 and a chain, or belt, drive 19, including pulleys or sprockets 20 and 21 on the transmission output shaft 22 and the rear wheel axle 24, respectively. The front castor-type steerable wheel 15 is manually controlled from an automotive type steering wheel 25 operating through a steering shaft 26 having a flexible shaft connection 28 to conventional steering gear mechanism 29 located at the top of, and mounted on, the front wheel vertical mounting journal 30. Journal 30 is mounted on the frame for vertical and fore-and-aft adjustment by bolts 23 selectively insertable in a plurality of adjustment holes 27.

The transmission output shaft 22 also carries a pulley, or sprocket, 31 which drives a hydraulic pump 32 by an endless chain or belt 34. A manually operable hydraulic control valve 35 controls the flow of hydraulic fluid through hydraulic lines 36 and 38 to a hydraulic motor 39. The output shaft 40 (see FIG. 2) of hydraulic motor 39 carries a sprocket 41 which drives a sprocket 42 (FIG. 3) through an endless chain 44. The sprocket 42 is fixedly mounted on a threshing rotor shaft 45. Referring jointly to FIGS. 2 and 3, it may be seen that rotor shaft 45 extends angularly across the machine frame from left rear to right front (FIG. 3) and also extends angularly downwardly from rear to front (FIG. 2) relative to the direction of travel of the machine. The direction of travel of the machine is from right to left as seen in FIGS. 1, 2, 3 and 6. The forwardmost end of shaft 45 is journalled in a bearing 46 carried on a bearing mount 48 which is slidably adjustable vertically on a pair of vertical top frame tube members 12 (see FIG. 2). Bearing mount 48 is locked in a selective one of a number of vertical positions by pins or bolts 49 extending through holes in bearing mount 48 and mating holes 50 in frame members 12. The upper rear end of shaft 45 is journalled in a bearing 51 carried on a carriage-like structure 52 which includes a pair of sleeve members 53 vertically slideable on a pair of vertical top frame member tubes 12 disposed at the left rear portion of the machine. The carriage structure 52 also carries hydraulic motor 39. Position locking pins 54 similar to front locking pins 49 serve to hold the rear portion of rotor shaft 45 in one of a selectable number of vertical positions. The bearings 46 and 51 are of the universally movable type whereby the front and rear ends of shaft 45 may be vertically adjusted relative to each other as well as being vertically movable simultaneously. Naturally, to accommodate the vertical adjustability of rotor shaft 45 the hydraulic fluid lines 36 and 38 are flexible.

Spaced along the axis of shaft 45 from front to rear are a series (three shown) of circular disc-like members 55, 56 and 57 of progressively increasing diameter. An annular series of elongated angle iron threshing members 58 (see FIGS. 8 and 9) are attached to the discs 55, 56 and 57 by suitable bracket members 59. This results in a generally frusto-conical configured threshing rotor having an axis of rotation which forms an upwardly and rearwardly diverging acute angle with the ground and simultaneously forms a laterally and rearwardly diverging acute angle with the row of grain stalks on which the threshing rotor operates (see FIG. 6).

Concentric with, and disposed radially outwardly from, the threshing rotor is a co-acting threshing concave structure indicated generally by the reference numeral 60. As is best seen in FIGS. 2 and 3, the concave 60 compises a smaller arcuate strap 61 disposed generally below and radially outwardly from the forwardmost portion of the threshing rotor and a larger arcuate strap 62 similarly disposed adjacent the rearmost portion of the threshing rotor. The straps 61 and 62 are inner-connected by elongated channel members 64 and 65 (see FIGS. 4 and 5) at their respective ends and bar frame member 66 intermediate their ends. A screen 68 and a plurality of threshing reaction bars 69 (see FIGS. 4 and 5) are carried on the concave frame structure. The screen and threshing reaction members are preferably removably attached to the concave frame structure in order that different screen mesh size and different sizes of threshing reaction bars may be substituted to accommodate a variety of different crops. It will be apparent from FIGS. 2 thru 5 that the threshing concave structure 60, in configuration, constitutes a portion of a frusto-cone concentric with the axis of rotor shaft 45 and of larger diameter than the frust-cone generated upon rotation of the threshing rotor. As is apparent in FIGS. 4 and 5 the threshing concave is spaced radially outwardly from rotor shaft 45 beyond the rotor threshing members 58 thereby providing a clearance space indicated by the dot and dash line 70 in FIGS. 4 and 5 between the rotor and concave.

The threshing concave structure is supported cantilever fashion by a frame structure 71 (FIG. 2) from a pair of vertically adjusted sleeves 72 on the same top frame tube members 12 which support the rear bearing carriage of rotor shaft 45.

A tapered auger indicated generally by the reference numeral 74 is fixed on rotor shaft 45 forwardly of the threshing elements of the rotor. The tapered auger 74 comprises the usual auger flighting 75 plus a pair of paddles or deflectors 76 which assist the flighting in feeding crop stalks into the passageway 70 between the threshing rotor and concave.

A pair of grain collecting pans 78 and 79 (see FIG. 3) are carried on base frame members 11 under the threshing rotor and concave. The grain collecting pans 78 and 79 are spaced apart transversely relative to the direction of travel of the machine thereby providing a passageway 80 (see FIG. 3) between the pans extending in the fore-and-aft direction the full length of the machine thereby enabling the machine to straddle a row of standing stalks and move generally parallel along the row while the stalks pass through the machine relatively from front to rear in the passageway 80 while still being attached to the ground. Baffles 81 and 82 (FIGS. 3) are provided and anchored respectively on the frame structure and on grain collecting pan 79 to prevent threshed grain from falling out of the machine through the passageway 80 and to deflect all the grain that might otherwise be lost through this space into one of the collecting pans 79 or 78. Screening, or other housing material 77 covers the entire top frame portion between the tubular members 12.

At the forwardmost part of the machine a pair of elongated divider members 84 and 85 are provided. The divider member 84 extends forwardly from the frame from a position adjacent the large diameter end of tapered feeding auger 74 and the adjacent end of fixed threshing concave 60. Divider 84 is adapted to extend forwardly along one side of the row of stalks which are entering into the machine. The other divider member 85 extends forwardly from the machine from a point adjacent the small diameter end, or tip, of tapered auger 74 and lies along the opposite side of the row of stalks entering the machine.

Referring particularly to FIGS. 6 thru 9, the operation of the above described invention is as follows: as the machine travels from right to left in FIG. 6 along a row of standing grain stalks indicated by the reference numeral 90 in FIG. 6, the divided members 84 and 85 isolate and separate the row of stalks 90 from adjacent rows. As the machine moves forwardly, the stalks 90 are engaged by tapered auger 74 which is rotating along with the threshing rotor in the direction of the arrows 91 in FIGS. 6, 8 and 9. The rotor shaft height is adjusted as previously described so that the auger engages each stalk of grain below the head portion of the stalk and deflects and feeds each stalk in succession laterally into the space 70 (FIGS. 4 and 5) between the threshing rotor and concave. Due to the angular relationship of the axis of rotation of the threshing rotor relative to the direction of travel of the machine the grain stalk progresses through the space 70 between the rotor and concave diagonally from left front to right rear as best illustrated by the showing in FIG. 6. FIGS. 7, 8 and 9 depict a stalk of material before harvesting (FIG. 7), as it enters the threshing operation (FIG. 8) and during the threshing operation (FIG. 9). In these figures it may be seen that the stem portion 95 of a given stalk is entered into the threshing space prior to entrance of the head portion 97 into the threshing space. The angular relationship of the threshing concave to the direction of travel of the machine in conjunction with the fact that the base of the crop stalk is still firmly attached to the ground, causes the stalk to be aggressively drawn from right to left (as seen in FIGS. 8 and 9) downwardly over the reaction bars 69 of the threshing concave as the machine passes along over the stalk. The effect of this movement is one of increasing the effectiveness of the fixed reaction bars of the concave. The relative movement between the head of the stalk and the concave produces an aggressive stripping action of the grains on the head starting with the lowermost grain and working toward the tip of the stalk. It should also be noted in FIGS. 8 and 9 that the direction of application of the contact of reaction bars 69 on the kernels of grain on the stalk is parallel to and toward the tip of the stem, not perpendicular thereto, and that as each kernel engages a reacion member 69 the point of contact is at the base of the kernel where it is attached to the stem due to the downward and lefward drawing motion of the stalk over the threshing concave. Simultaneously with the above, the threshing rotor is turning in the direction of arrows 91. So far as the point of engagement and direction of application of threshing impact is concerned, it will be apparent in FIGS. 8 and 9 that the threshing bars 58 on the rotor operate on the head portion of the stalk in the same manner as the concave bars 69 only with a much more aggressive action due to the rotor motion. The above described threshing action between the rotor, concave and grain stalks is attributable to the laterally and rearwardly diverging acute angle at which the rotor axis extends relative to the row of crop stalks. The tapered configuration of the threshing rotor and concave also results in a progressively increasing peripheral, or impact, speed of the threshing bars 58 along the length of the bars from the small diameter end of the rotor to the large diameter end. Thus, easily dislodged grain kernels are quickly threshed from the stem at relatively low rotor speeds almost immediately upon entering the threshing space 70, while kernels that are more firmly attached to the stems are subjected to progressively increasing rotor speeds as the stalk moves relatively rearwardly through the threshing space 70.

The above machine was devised to test the novel threshing principles disclosed herein. It will be readily apparent that certain modifications and departures from the specific structure illustrated may be desirable in a final production machine. For example, conventional grain conveyors and storage bins may be added to increase the grain collecting capacity of the device. A plurality of the herein disclosed threshing units may be provided on a single mobile frame to increase the grain threshing capacity of the machine. While this invention has been described in connection with a particular embodiment thereof, it will be understood that it is capable of further modification and this application is intended to cover any variations, uses, or adaptations following, in general, the principles of the invention and including such departures from the present disclosure as come within known or customary practice in the art to which the invention pertains and as fall within the scope of the invention or the limits of the appended claims.

Having thus described our invention, what we claim is:

1. A device for harvesting grain or the like from standing stalks comprising, a mobile frame adapted to travel forwardly over the ground generally parallel to a given row of standing grain stalks and having means thereon defining a fore-and-aft extending passageway through which said rows of stalks moves relatively rearwardly, rotary threshing means having an axis of rotation, means journaling said rotary threshing means on said frame with said axis of rotation forming a laterally and rearwardly diverging acute angle with said passageway, said threshing means tapering from a forward end of minimum diameter adjacent said passageway to a rear end of greater diameter, a tapered threshing concave fixedly mounted on said frame concentric with said axis of rotation and spaced radially outwardly from said rotary threshing means thereby defining a space between said threshing means and said concave through which crop stalks may pass relatively from front to rear as said frame moves forwardly along said row of stalks, feed means on said rotary threshing means at the forwardmost end thereof and disposed across said passageway to feed said crop stalks into said space between said threshing means and said cave, drive means on said frame connected to said threshing means for rotating the threshing means about said axis of rotation to thresh the grain from the crop stalks passing through said space, and grain collecting means carried on said frame and disposed to catch kernels of grain removed from the stalks by said threshing means.

2. A device for harvesting grain or the like from standing stalks comprising, a mobile frame adapted to travel forwardly over the ground generally parallel to a given row of standing grain stalks and having means thereon defining a fore-and-aft extending passageway through which said row of stalks moves relatively rearwardly, a threshing rotor having a generally frusto-conical configuration and an axis of rotation coaxial with the axis of the frustum, means journaling said rotor on said frame with the smaller diameter end forwardly of the larger diameter end and with said axis of rotation forming an upwardly and rearwardly diverging acute angle with the ground and simultaneously forming a laterally and rearwardly diverging acute angle with said passageway, a threshing concave conforming in configuration to a portion of said threshing rotor fixedly mounted on said frame concentric with said axis of rotation and spaced radially outwardly from said rotor thereby defining a space between said threshing rotor and said concave through which the upper portion of standing grain stalks may pass relatively from front to rear as said frame moves forwardly along said row of stalks, feed means on said threshing rotor at the forwardmost end thereof and disposed across said passageway to feed said crop stalks into said space, drive means on said frame connected to said threshing rotor for rotating the threshing rotor about said axis of rotation to thresh the grain from the crop stalks passing through said space, and grain collecting means carried on said frame and disposed to catch kernels of grain removed from their stalks by said threshing rotor.

3. A device for harvesting grain or the like from standing stalks as recited in claim 2 wherein said feed means comprises a tapered auger mounted on said threshing rotor for rotation therewith about said rotor axis, said auger having a maximum diameter and adjacent said threshing rotor and tapering to a minimum diameter end away from said rotor, said auger extending across said passageway to engage stalks moving rearwardly through said passageway and feed said stalks into said space between the rotor and concave.

4. A device for harvesting grain or the like from standing stalks as recited in claim 3 wherein grain stalk divider members are mounted on said frame, one of said divider members extending forwardly from said frame adjacent said minimum diameter end of said tapered auger and adapted to extend along one side of said given row of grain stalks, another of said divider members extending forwardly from said frame adjacent said maximum diameter end of said tapered auger generally parallel to and laterally spaced from said one divider member and adapted to extend along the other side of said given row of grain stalks thereby separating the stalks in said given row from stalks in adjacent rows whereby only stalks growing in said given row are engaged by said tapered auger as said device moves forwardly along said given row.

5. A device for harvesting grain or the like from standing stalks comprising, a mobile frame adapted to travel forwardly over the ground generally parallel to a given row of standing grain stalks and having means thereon defining a fore-and-aft extending passageway through which said row of stalks moves relatively rearwardly, an elongated rotor structure having a central axis of rotation, said rotor structure having a maximum diameter at one end and tapering along said axis to a minimum diameter at the other end, means on said rotor structure to engage grain kernels on a stalk of grain and separate said kernels from said stalk upon rotation of said rotor structure about said axis, means journaling said rotor structure on said frame with said minimum diameter end ahead of said maximum diameter end and with said axis of rotation forming an upwardly and rearwardly diverging acute angle with the ground and simultaneously forming a laterally and rearwardly diverging acute angle with said passageway, a concave structure conforming in configuration to a portion of said rotor structure, means fixedly mounting said concave structure on said frame concentric with said axis of rotation and spaced radially outwardly from said rotor structure thereby defining a space between said rotor structure and said concave structure through which the upper portion of standing grain stalks may pass relatively from front to rear as said frame moves forwardly along said row of stalks, said concave structure including means engageable with grain stalks moving through said space to guide said stalks into engagement with said rotor structure kernel engaging means, feed means on said rotor structure at the forwardmost end thereof and extending across said passageway to engage stalks growing in said given row and feed said stalks into said space, drive means on said frame connected to said rotor structure for rotating the rotor structure about said axis of rotation, and grain collecting means carried on said frame and disposed to catch kernels of grain removed from their stalks by coaction of said rotor structure and concave structure.

6. A device for harvesting grain or the like from standing stalks as recited in claim 5 wherein said means mounting said concave structure on said frame comprises members vertically adjustable relative to said frame whereby said concave structure is selectively adjustable toward and away from said rotor structure.

7. A device for harvesting grain or the like from standing stalks as recited in claim 5 wherein said means journaling said rotor structure on said frame comprises a first bearing at one end of said rotor structure, a second bearing at the other end of said rotor structure, a first bearing mount connected to said frame for vertical adjustment relative to the frame and carrying said first bearing, and a second bearing mount connected to said frame for vertical adjustment relative to the frame and carrying said second bearing whereby said rotor structure is adjustable vertically as a unit and said rotor ends are independently adjustable vertically relative to each other.

8. A device for harvesting grain or the like from standing stalks as recited in claim 5 wherein said grain collecting means comprises a pair of grain receivers spaced apart transversely relative to the direction of travel of said frame thereby defining said passageway through which grain stalks may pass relatively from front to rear through said device while still rooted in the ground, and fixed grain deflecting baffles disposed to prohibit threshed grain from falling through said passageway and to guide said grain into said receivers.

9. A device for harvesting grain or the like from standing stalks as recited in claim 5 wherein said feed means comprises a tapered auger mounted on said rotor structure for rotation therewith about said axis of rotation, said auger having a maximum diameter end adjacent said threshing rotor and tapering to a minimum diameter end away from said rotor structure, and deflector members on said auger at the maximum diameter end thereof to guide stalks from said auger into said space between the rotor structure and the concave structure, said auger extending across said pasageway to engage each stalk standing in said given row as said frame travels along said given row and said stalks move relatively rearwardly through said passageway.

10. A device for harvesting grain or the like from standing stalks as recited in claim 9 wherein elongated divider members are mounted on said frame adjacent the respective ends of said auger, said divider members extending forwardly from said frame, respectively, on opposite sides of said passageway thereby guiding the stalks in said given row into said auger as said frame travels along said given row and guiding stalks growing in adjacent rows away from said auger.

References Cited by the Examiner

UNITED STATES PATENTS

| | | | |
|---|---|---|---|
| 467,477 | 1/1892 | Buchanan | 130—27.8 |
| 636,085 | 10/1899 | Temple | 56—130 |
| 1,092,757 | 4/1914 | Schultz | 130—27.17 |
| 1,262,559 | 4/1918 | Pritchard | 56—130 |
| 1,267,138 | 5/1918 | Spry | 56—130 |
| 1,303,120 | 5/1919 | Hasket et al. | 56—130 |
| 1,344,332 | 6/1920 | Christopher | 130—30 |
| 1,413,758 | 4/1922 | Milton | 130—27.17 |
| 1,911,665 | 5/1933 | Baldwin | 130—27.12 |
| 1,949,774 | 3/1934 | Baldwin | 130—27.12 |
| 2,318,188 | 5/1943 | Anderson et al. | 130—27.35 |

ABRAHAM G. STONE, *Primary Examiner.*

J. O. BOLT, *Assistant Examiner.*